United States Patent
Seguin et al.

(10) Patent No.: US 6,952,427 B1
(45) Date of Patent: Oct. 4, 2005

(54) METHOD FOR TERMINALS TO HAVE ACCESS TO A COMMON RESOURCE OF A NETWORK

(75) Inventors: Laure Seguin, Rennes (FR); Bertrand Houzel, Rennes (FR)

(73) Assignees: Mitsubishi Electric Information Technology Centre Europe B.V., Rennes (FR); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/547,989

(22) Filed: Apr. 12, 2000

(30) Foreign Application Priority Data

Apr. 13, 1999 (FR) .................................. 99 04857

(51) Int. Cl.⁷ ............................................... H04J 3/02
(52) U.S. Cl. ....................................... 370/462; 370/443
(58) Field of Search .............................. 370/329, 346, 370/347, 443–445, 448, 462

(56) References Cited

U.S. PATENT DOCUMENTS

| 5,625,628 | A | * | 4/1997 | Heath ........................ 370/321 |
| 5,636,223 | A | * | 6/1997 | Reardon et al. ............ 370/431 |
| 5,729,542 | A | * | 3/1998 | Dupont ....................... 370/346 |
| 5,862,488 | A |   | 1/1999 | Kotzin et al. |
| 6,243,695 | B1 | * | 6/2001 | Assaleh et al. ............... 706/20 |
| 6,400,695 | B1 | * | 6/2002 | Chuah et al. ............... 370/310 |
| 6,418,136 | B1 | * | 7/2002 | Naor et al. ................. 370/347 |

FOREIGN PATENT DOCUMENTS

| EP | 0475698 A | 3/1992 |
| WO | WO 9719525 | 5/1997 |

* cited by examiner

*Primary Examiner*—Man U. Phan
*Assistant Examiner*—Toan Nguyen
(74) *Attorney, Agent, or Firm*—Birch, Stewart, Kolasch & Birch, LLP

(57) ABSTRACT

The present invention concerns a method for terminals to have access to a common resource of a network. It is characterised in that the said network defines the access conditions of a plurality of access classes and transmits the said conditions to all the terminals liable to have access to the said resource and in that a terminal wishing to have access to the said resource determines the access class to which it belongs according to its access state and gains access to the said resource according to the access conditions of the said access class thus determined.

15 Claims, No Drawings

METHOD FOR TERMINALS TO HAVE ACCESS TO A COMMON RESOURCE OF A NETWORK

FIELD OF THE INVENTION

The present invention concerns a method for terminals to have access to a common resource or network, for example via a shared channel.

BACKGROUND OF THE INVENTION

Such a method can find an application in a network of mobile terminals of the type where a terminal gains access to the said network via a shared so-called random access channel. Generally, in this type of network, each terminal gains access to the network without any access control mechanism, for example according to the availability of the common resource with high risks of interference and disturbance with the surrounding terminals. In this context, the present method can find an application for restricting the level of interference generated by the terminals attempting to gain access to the common resource.

More precisely, in the context of UMTS (Universal Mobile Telecommunications System), the method of the present invention will find an application for mobiles to have access to the shared random access channel RACH (Random Access CHannel) or the uplink shared channel USCH (Uplink Shared CHannel).

Methods of access to a common resource, consisting for example of a shared channel, are already known. For example, according to a first embodiment, a terminal which is to gain access to this resource makes a request which is then processed by the network. The latter manages the resource, knowing all the requests made by the different terminals sharing it. According to the number of these requests, the network grants or rejects the application.

The drawback of this method is the load which is generated on the uplink between the terminals and the network by the requests from the terminal.

Another method consists of the fact that the network manages the common resource by supplying common parameters to the terminals. These parameters enable it to have statistical control of the shared resource. The common parameters are for example an access probability which represents the probability of the terminal having access successfully to the common resource, a time which the terminal must wait between two access attempts, or an access period.

The drawback of this method lies in the fact that the terminals are all on an equal footing so that the network does not at all take account of their actual requirements.

DETAILED DESCRIPTION

It has been sought to propose a method for terminals to have access to a common resource of a network which has the advantages of the prior methods but which does not have the drawbacks thereof, that is to say which does not cause a significant load on the uplink between the terminal and the network and which also takes account of the actual requirements of the terminals.

To this end, a method for terminals to have access to a common resource of a network according to the present invention is characterised in that the said transmits the said conditions to all the terminals wishing to have access to the said common resource and in that a terminal wishing to have access to the said resource determines the access class to which it belongs according to its access state and gains access to the said resource according to the conditions of access of the said access class thus determined.

The said access conditions of each access class are for example an access probability, a time between two access attempts and a period of access to the said common resource.

Each terminal wishing to have access to the said resource can then draw a number at random and, when the said number is less than the access probability of the class to which it belongs, it gains access to the said resource for the access period corresponding to the access class which it belongs and, when the said number is greater than the access probability of the class to which it belongs, it waits for the said time between two attempts in order to make a further access attempt again, a terminal which has never yet made any access attempts belonging to the access class whose access probability is the lowest.

The said network transmits the said conditions of each of the said classes of all the terminals wishing to have access to the said common resource.

According to a variant, the said network transmits, to all the terminals wishing to have access to the said common resource, at least one parameter common to each of the said access classes, at least one weighting parameter being defined or predefined for each access class, and each terminal which has determined the access class to which it belongs deduces the said common parameter or parameters and the parameter or parameters weighting the said access conditions.

The said parameters common to each access class are for example a common access probability, a time between two attempts to have access to the said resource and/or an access period, the access conditions of an access class then being defined by an access probability, an access time and an access period which are respectively obtained by weighting the said common parameters by any said corresponding weighting parameters.

A terminal advantageously determines a class to which it belongs according to past factors concerning it. The said past factors are for example the number of failures of the said terminal to gain access to the said resource. Each access class is then advantageously defined so that the access probability increases with the number of access failures.

The said past factors can also be the number of successes in the said terminal having access to the said resource. Each access class is then advantageously defined so that the access probability decreases with the number of access successes.

A terminal can also determine the access class to which it belongs according to at least one parameter of its traffic. A terminal can then determine the access class to which it belongs according to the state of its buffer memories at the moment of the access attempt under consideration. The access conditions of the different classes are then designed so as to increase the access probability with the degree of filling of the said buffer memories.

According to another characteristic of the invention, the network defines the access conditions of each access class according to the number of terminals which are situated in each access class.

To do this, only some of the terminals inform the network on the access class to which the said terminals belong so that it can evaluate the number of terminals which are situated in each access class. Advantageously, the number of terminals informing the said network about the total number of terminals depends on the total number of terminals.

According to a variant, a terminal informs the network of its access class only when it changes access class.

According to another characteristic of the present invention, the network estimates the number of terminals which are situated in each access class by considering the number of accesses to the said resource.

A description will now be given of modes of implementing the present invention.

In the example implementation now described, the network broadcasts, to all the terminals able to access the common resource, parameters common to each class $G_0$ to $G_o$, these parameters being a probability Pc and a time Tc between two attempts to access the said resource. The access conditions related to each access class $G_i$ are for example a probability Pi and a time Ti. Amongst the common parameters, an access period Dc can also be defined, and, amongst the access conditions related to a class $G_i$, there is the access period Di during which the terminal which gained access to the said common resource can keep the resource.

These common parameters will enable each terminal to be able to have access to the common resource in accordance with the characteristics of the access class to which it belongs. A terminal which wishes to have access to the common resource must, initially, determined the class $G_i$ to which it belongs. This determination depends on its access state. In the context of the present invention, access state means the state of the terminal under consideration at the time of an access attempt. For example, it may be a case of past factors concerning it, such as the number of access successes which it has received or the number of failures which it has undergone, such as also a traffic parameter such as the state of its buffer memories, etc.

For example, if it is a question of the number of failures it has suffered, it will belong to class $G_0$ when it has not suffered any access failures. This will for example be because it is the first time that it has access to the common resource. It will belong to class $G_1$ when it has suffered a failure, to class $G_2$ when it has suffered two failures, etc.

For example, if it is a question of the state of its buffer memories, it will belong to class $G_0$ when they are at least 50% filled, to class $G_1$ when they are between 50% and 75% filled, to class $G_2$ when they are between 75% and 90% filled, etc.

Once the access class $G_i$ which it belongs has been determined, the terminal under consideration can have access to the common resource in accordance with the access conditions which result from this class.

For example, these access conditions are an access probability $P_i$, an access time $T_i$ between two access attempts and/or an access period $D_i$. The probability $P_i$ of access by a terminal which belongs to class $G_i$ is equal to the common probability Pc multiplied by a weighting parameter $K_i$ defined or predefined for the class $G_i$:

$$P_i = K_i \times Pc$$

Likewise, the access time $T_i$ is equal to the access time Tc multiplied by a weighting parameter $L_i$ defined or predefined for class $G_i$:

$$T_i = L_i \times Tc$$

And the access period $D_i$ for the access class $G_i$ is defined by:

$$D_i = M_i \times Dc.$$

The weighting parameters $K_i$, $L_i$ and $M_i$ are not necessarily equal to each other.

The different parameters $K_0$, $K_1$, $K_2$ as chosen so as to increase with the number of the corresponding class so as to advantage the "ulucky" terminals. This is because, the more the terminals belong to a high-index group, the more their access probability $P_i$ is increased.

The same applies to the parameters $M_0$, $M_1$, $M_2$.

On the other hand, the parameters $L_0$, $L_1$, $L_2$ are chosen so as to decrease with the number of the corresponding class.

For example, in order to gain access to the common resource with these access conditions consisting of the probability $P_i$ and the time $T_i$ between two attempts, a terminal can operate as follows. It chooses a number at random between 0 and 100%. If this number is less than or equal to the probability $P_i$ characteristic of the class $G_i$ to which it belongs, it gains access to the common resource for the period $D_i$ also characteristic of class $G_i$, otherwise it must wait for time $T_i$ in order to make a new access attempt.

The fact that the network broadcasts the parameters Pc and Tc to the terminals enables it to manage and control the number of accesses to a common access resource. This number of accesses depends on the number of terminals in each of the classes rather than on the total number of terminals liable to gain access to the common resource. This is because, since each class $G_i$ has a different access probability $P_i$, the number of terminals in each class $G_i$ therefore has a different weight for each of them.

Thus, in order to manage and control the number of accesses, the network must estimate the number of terminals in each class.

This can be carried out from information sent up by the terminals to the network.

For example, only some of the terminals inform the network about the access class to which the said terminals belong. The ratio "Number of terminals polled to Total number of terminals" then depends on the total number of terminals. This is because, in order to have a good estimation of the number of terminals per class, it is necessary to adapt the number of terminals polled according to the total number of terminals. A ratio of 10% a would for example be sufficient with 1000 terminals, but completely incorrect with 10 terminals.

According to one variant, a terminal informs the network of its access class when it changes it. This makes it possible to limit the number of terminal/network transactions.

According to another variant, from the number of accesses to the common resource under consideration, and knowing the parameters which govern the change of a terminal from one class to another, the network estimates the number of terminals in each of the classes and, from there, chooses the value of the common parameters to be broadcast to all the terminals liable to have access to the common resource.

What is claimed is:

1. Method for terminals to have access to a common resource of a network, comprising:
    defining in said network the access conditions of a plurality of access classes;
    transmitting the access conditions to all the terminals liable to have access to the said common resource;
    determining, at a terminal wishing to have access to the resource, the access class to which it belongs according to an internal state of the terminal; and
    gaining access to the common resource according to the access conditions of the access class thus determined by the terminal;
    wherein the terminal determines the access class to which it belongs according to past factors which include the number of failures of the terminal to gain access to the common resource or the number of successes of the terminal in gaining access to the the common resource; wherein said network transmits, to all the terminals wishing to have access to the said common resource, at least one parameter common to each of the said access classes, in that at least one weighting parameter is defined or predefined for each access class and in that each terminal which has determined its access class deduces the said access conditions from the said common parameter or parameters.

2. Method according to claim 1, wherein said network transmits the access conditions of each of the said classes to all the terminals wishing to have access to the said common resource.

3. Method according to claim 1, wherein said parameters common to each access class are an access probability, a time between two access attempts and/or an access period, the access conditions of an access class then being defined by an access probability, an access time and/or an access period which are respectively obtained by weighting the common parameters with any said corresponding weighting parameters.

4. Method according to claim 1, wherein each access class is defined so that the access probability increases with the number of failures in gaining access to the said common resource when the access class is selected based on the number of failures of said terminal to gain access to said common resource.

5. Method according to claim 1, wherein each access class is defined so that the access probability decreases with the number of access successes when the access class is selected based on the number of successes in gaining access to said common resource.

6. Method according to claim 1, wherein the network defines the access conditions of each access class according to the number of terminals which are situated in each access class.

7. Method according to claim 6, wherein some of the terminals inform the network about the access class to which the said terminals belong so that it can evaluate the number of terminals which are situated in each of the said access classes.

8. Method according to claim 7, wherein the number of terminals informing the said network depends on the total number of terminals that can access said network.

9. Method according to claim 7, wherein a terminal informs the network of its access class only when it changes access class.

10. Method according to claim 6, wherein the network estimates the number of terminals which are situated in each access class by considering the number of accesses to the said common resource.

11. Method for terminals to have access to a common resource of a network, comprising:
defining in said network the access conditions of a plurality of access classes;
transmitting the access conditions to all the terminals liable to have access to the said resource;
determining, at a terminal wishing to have access to the resource, the access class to which it belongs according to an internal state of the terminal; and
gaining access to the said resource according to the access conditions of the access class thus determined by the terminal;
wherein said access conditions of each access class are an access probability, a time between two attempts to gain access to the network and/or a period of access to the common channel; and
wherein each terminal wishing to have access to the said common resource draws a number at random and, when the said number is less than the access probability of the class to which it belongs, it gains access to the said common resource for the access period corresponding to the class to which it belongs and, when the said number is greater than the access probability of the class to which it belongs, it waits for the said time between two access attempts in order to make a further access attempt again, a terminal which has never yet made any access attempts belonging to the access class whose access probability is the lowest.

12. Method for terminals to have access to a common resource of a network, comprising:
defining in said network the access conditions of a plurality of access classes;
transmitting the access conditions to all the terminals liable to have access to the said common resource;
determining, at a terminal wishing to have access to the resource, the access class to which it belongs according to an internal state of the terminal; and
gaining access to the common resource according to the access conditions of the access class thus determined by the terminal;
wherein a terminal determines the access class to which it belongs according to at least one parameter of its traffic and the state of its buffer memories at the moment of the access attempt under consideration.

13. Method according to claim 12, wherein the access conditions of the different classes are designed to increase the probability of access with the degree of filling of the said buffer memories.

14. A method for allocating access to a common resource by a plurality of terminals in a network, the method comprising the steps of:
defining an access condition for each access class within the network for accessing the common resource;
transmitting the access conditions to each terminal connected to the network for each access class;
determining, for each of the plurality of terminals, which access class the terminals belong to according to a set of parameters common to each of the plurality of terminals, the set of parameters of all terminals including a common probability of access to the common resource for each of the plurality of terminals;
weighting the common probability by a corresponding weighting factor to obtain a local probability for each access class, thereby terminals with a historical lower local probability of access are designated in access classes which have a higher probability of access.

15. The method of claim 14, wherein the set of parameters common to each of the plurality of terminals further include a time between access attempts to the common resource, an access period to a common channel and the amount of data traffic by each of the plurality of terminals.

* * * * *

UNITED STATES PATENT AND TRADEMARK OFFICE
CERTIFICATE OF CORRECTION

| | |
|---|---|
| PATENT NO. | : 6,952,427 B1 |
| APPLICATION NO. | : 09/547989 |
| DATED | : October 4, 2005 |
| INVENTOR(S) | : Laure Seguin et al. |

It is certified that error appears in the above-identified patent and that said Letters Patent is hereby corrected as shown below:

On the face of the patent, please change item (73) from:

"Assignees: Mitsubishi Electric Information Technology Centre Europe B.V., Rennes (FR); Mitsubishi Denki Kabushiki Kaisha, Tokyo (JP)" to:

--Assignee: Mitsubishi Denki Kabushiki Kaisha, Tokyo (JP)--.

Signed and Sealed this

Fifth Day of September, 2006

JON W. DUDAS
*Director of the United States Patent and Trademark Office*